Sept. 2, 1941.  L. KENNON  2,254,657
ROLL WELDING ELECTRODE
Filed May 13, 1940
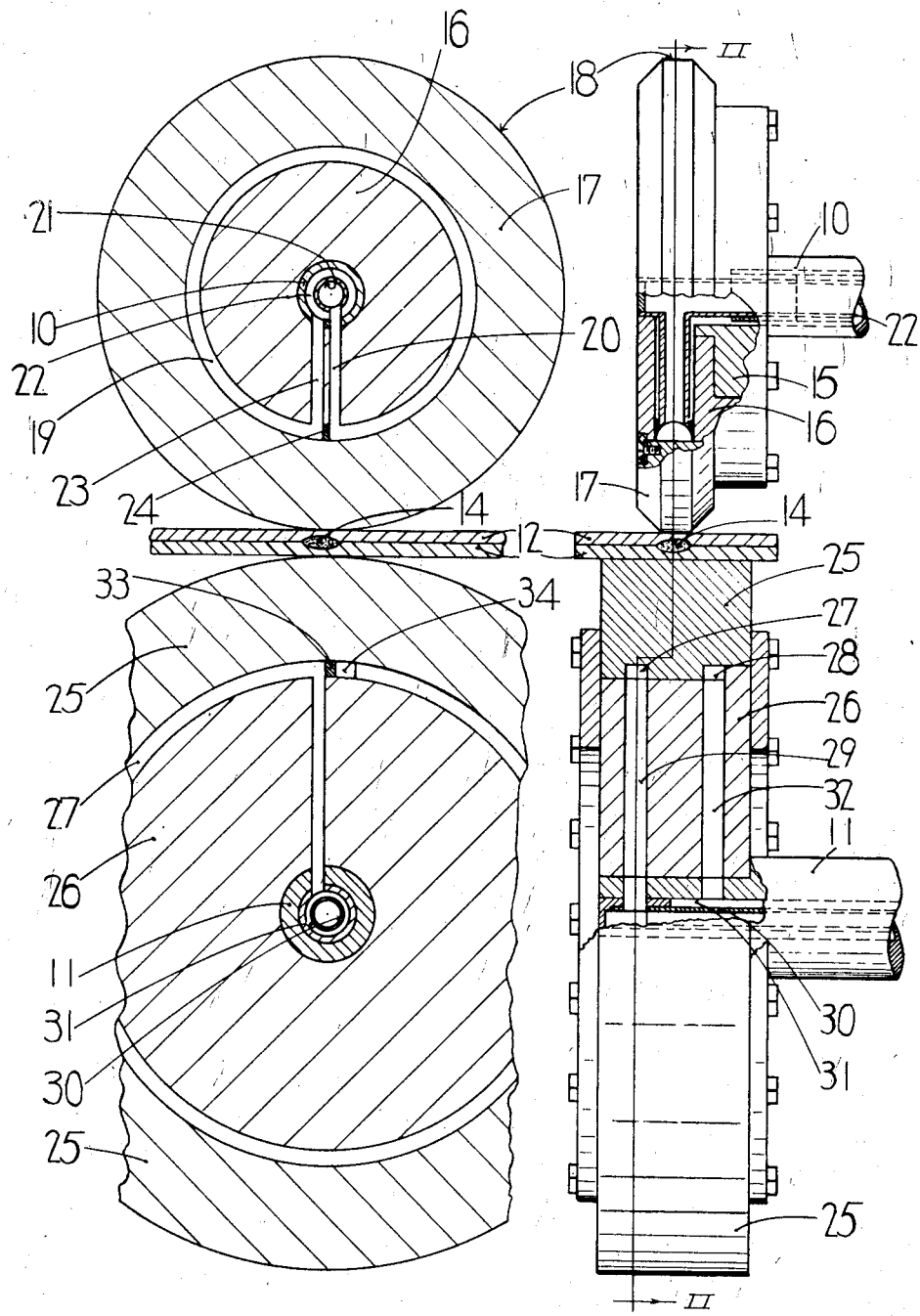
FIG-II  FIG-I
INVENTOR
Lorenzo Kennon Patented Sept. 2, 1941

2,254,657

UNITED STATES PATENT OFFICE 2,254,657

ROLL WELDING ELECTRODE

Lorenzo Kennon, Burbank, Calif., assignor to Lockheed Aircraft Corporation, Burbank, Calif.

Application May 13, 1940, Serial No. 334,748

8 Claims. (Cl. 219—4)

This invention relates to an improved method of removing excess heat from the periphery of the rolls of an electric resistance welding machine of the semi-automatic seam or spot welding type.

In welding machines of this type wherein semi-automatic operation on a seam or built-up structural member is contemplated, a number of independent variables control the resulting sequential spot welds, so that to maintain uniform conditions for a series of welds becomes difficult. The rolls used to contact the work must conduct a very high amperage to the welding area, and the resistance produces considerable heat in the rolls, further increasing the resistance to the electric current and thus affecting the heat actually generated at the welded surfaces, as well as increasing the likelihood of the roll picking up metal from the material being worked on. A lower electrode temperature reduces or eliminates mushrooming of the electrode in contact with metal being welded by preventing said electrode material from becoming annealed. It has heretofore been proposed to use internally cooled welding machines for butt welding tube or pipe, as well as externally applied water sprays. Internally cooled rolls as heretofore used tend to develop uneven peripheral temperatures due to the presence of dead spots or steam pockets, and external sprays are unsatisfactory for welding operations on aluminum or its alloys due to too rapid cooling thereof, which results in cracks. When the water flow is reduced to prevent cracks, the roll electrode is not cooled effectively.

It is accordingly an object of this invention to provide an improved roll electrode cooling system adapted to provide a reduced and stabilized temperature value during the welding operation, whereby a series of uniform welds can be obtained duplicating the predetermined amperage input at the welding area.

It is another object of this invention to provide an improved and simplified internally cooled welding roll electrode wherein water is circulated through defined paths at a uniform velocity, to avoid the creation of dead spots or steam pockets that would permit overheating of portions of the periphery of the roll.

It is a further object of this invention to provide an improved and simplified welding roll electrode that has water passages formed therein and partially defined by a replaceable wearing rim or roll periphery, since rolls require frequent dressing to maintain a smooth surface and prevent metal pick-ups, with a consequently rapid rate of wear of relatively expensive special electrode material.

Other and further important objects of this invention will be apparent from the disclosures in the specification and the accompanying drawing.

This invention in its preferred form is illustrated in the drawing and hereinafter more fully described.

In the drawing:

Figure I is a fragmentary side view, partly in elevation and partly in section, of upper and lower roll or wheel electrodes comprising two embodiments of this invention.

Figure II is a fragmentary section on the line II—II of Figure I, showing the water circulating passages in the rolls.

As shown:

It has been thought unnecessary to disclose a conventional type of electric welding machine in connection with this invention, since the roll structure would be equally applicable to different machines, and the operation thereof will be understandable to those skilled in the art without reference to machine details. It will therefore suffice to state that a conventional electric resistance welding machine would have supporting means for roll shafts 10 and 11, either or both shafts being driven. Suitable means would permit separation of the roll shafts for insertion of two or more layers of the material 12 to be welded as indicated at 14. As far as this invention is concerned, it is immaterial whether seam welding, involving overlapping welds; or spaced spot welding, is contemplated; the latter arrangement being preferable for structural purposes wherein fluid tightness is not an essential.

The upper shaft 10 is flanged at 15 to receive an adapter or roll core 16 to which a traversely contoured rim 17 is applied. The rim 17 is formed with a peripheral land 18 of a width corresponding to the desired spot weld diameter, which land must be maintained in perfect condition to avoid imperfect welds and metal pickups, as constant dressing wears it away rapidly. To use electrode rolls of small, medium, and large diameters, one or more adapters or cores 16 of corresponding diameters may be used, both to reduce the wastage of the rim 17 and to bring the cooling passages closer to the periphery thereof.

By mounting the rim as a readily replaceable element of the wheel, the expensive material necessary for the hub and shaft does not require replacement, and all the water circulating passages can be formed in the shaft and adapter or core. To this end a channel 19 is machined in the periphery of the adapter or core 16 which channel is closed by the application of the rim 17 and is fed water through a radial tube 20 leading from a central supply pipe 21 in the bore 22 of the shaft 10, the water being forced around through the channel 19 and back to the shaft bore 22 through a radial return passage 23 adjacent the inlet tube 20, the channel 19 being closed by a plug 24 between the inlet and outlet passages 19 and 23 respectively. By providing a water passage of substantially uniform area, a forced circulation of water therethrough produces a uniform velocity at all points, preventing the formation of steam pockets and providing adequate and uniform cooling at all points of the periphery of the roll or rim.

The wide rimmed roll 25 carried by the lower shaft 11 is intended to disclose a variation of the invention particularly adaptable to use as a support for a bar type electrode. Such a bar electrode arrangement is not part of this invention so that the particular form of roll is shown for illustrative purposes in connection with the more normal type of spot or seam welding roll electrode already described. The shaft 11 carries an adapter 26 to which the rim 25 is applied as before described, the extra width of the adapter and rim permitting the use of two channels 27 and 28, a radial inlet passage 29 leading from a central supply pipe 30 in the hollow bore 31 of the shaft 11, to one channel 27, and a similar outlet passage 32 discharging from the other channel 28 to the shaft bore 31. Both channels are closed by plugs 33, a cross passage 34 connecting the channels to force a water circulation counter-clockwise in channel 28 thence clockwise to the outlet passage 32.

While it would be preferable to arrange the water flow in the upper roll to provide a countercurrent as regards the direction the work is fed under the wheel, this is not essential for intermittent working periods; and of course the double flow in the lower wheel would maintain uniform conditions for either direction of work feed. In continuous operation, the conductivity of the electrode metal is held at a higher value than when in a heated state, the hardness and other physical properties are protected, and the electrode pick-up of weld metal is reduced, thereby reducing the frequency of cleaning and redressing operations, with an improvement in the uniformity and physical qualities of the welds.

It will thus be seen that I have invented an improved and simplified roll electrode structure facilitating replacement and providing for adequate and uniform cooling by means of a forced circulation of cooling water.

Having thus described my invention in its present preferred embodiment, I desire to emphasize the fact that many modifications may be resorted to in a manner limited only by a just interpretation of the following claims.

I claim:

1. In a contact roll for electric resistance welding machines, a ring member forming the contacting surface, means for supporting said ring for rotary movement, said supporting means having a peripheral passage for a cooling fluid, said passage being partly defined by the ring when applied to the supporting means, and means for supplying and discharging a forced circulation of cooling fluid to said peripheral passage.

2. In a contact roll for electric resistance welding machines, a ring member forming the contacting surface, means for supporting said ring for rotary movement, said supporting means having a peripheral passage of uniform cross-section for cooling fluid, said passage being formed in said supporting means and sealed by the ring when applied to the supporting means, and means for supplying and discharging a forced circulation of fluid of uniform velocity to said peripheral passage.

3. In an electric resistance welding machine, the combination of a shaft having cooling supply and discharge connections thereto, and a roller electrode carried by said shaft, comprising an adapter member supported on said shaft and having circumferential cooling passages thereon with supply and discharge passages leading to the cooling supply connections in the shaft, and a ring member applied to the periphery of said adapter and forming part of the enclosure of the cooling supply passages on said adapter.

4. In an electric resistance welding machine, a roller electrode comprising an adapter member having exposed circumferential cooling passages thereon and an electrode ring member applied to the periphery of said adapter and forming part of the enclosure of the cooling passages on said adapter.

5. In a roller electrode for spot and seam welding machines, a shaft, an adapter carried thereby, a ring member forming the wearing surface of said electrode and applied to the periphery of said adapter, and circumferential water channels formed between the mating surfaces of the adapter and the ring member adapted to define countercurrent water passages of uniform area, whereby to prevent the formation of steam pockets and provide for the uniform cooling of said ring member.

6. In a roller electrode for spot and seam welding machines, a shaft, an adapter carried thereby, a ring member forming the wearing surface of said electrode and applied to the periphery of said adapter, and parallel interconnected circumferential water channels formed between the mating surfaces of the adapter and the ring member adapted to define countercurrent water passages of uniform area in direct contact with said ring member, whereby to prevent the formation of steam pockets and provide for the uniform cooling of said ring member.

7. In a contact roll for electric resistance welding machines, a ring member forming the contacting surface, means for supporting said ring for rotary movement, said ring member and supporting means having an annular passage for a cooling fluid therebetween, said passage being formed in either the ring or the supporting means and sealed when the ring member is applied to the supporting means, and means for supplying and discharging a forced circulation of cooling fluid to said annular passage.

8. In a contact roll for electric resistance welding machines, a ring member forming the contacting surface, an adapter for supporting said ring for rotary movement, said ring member partly defining an interior passage for cooling liquid, said passage being completed by the surface of said adapter in contact with the ring member, and means for supplying and discharging a forced circulation of cooling fluid to said interior passage.

LORENZO KENNON.